Feb. 3, 1953 A. T. VANCE 2,627,331
VANE TYPE FLUID CLUTCH
Filed May 6, 1947
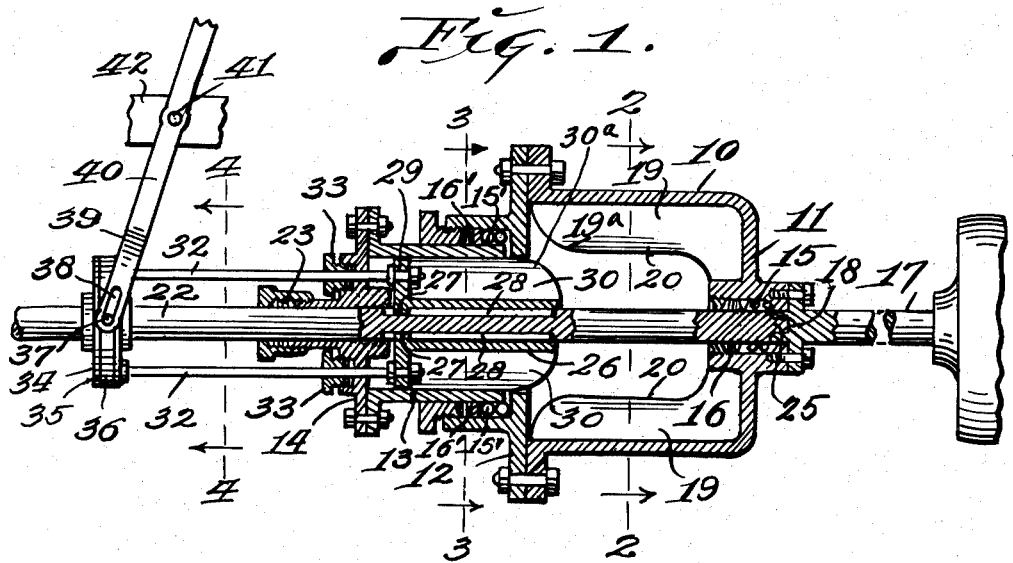
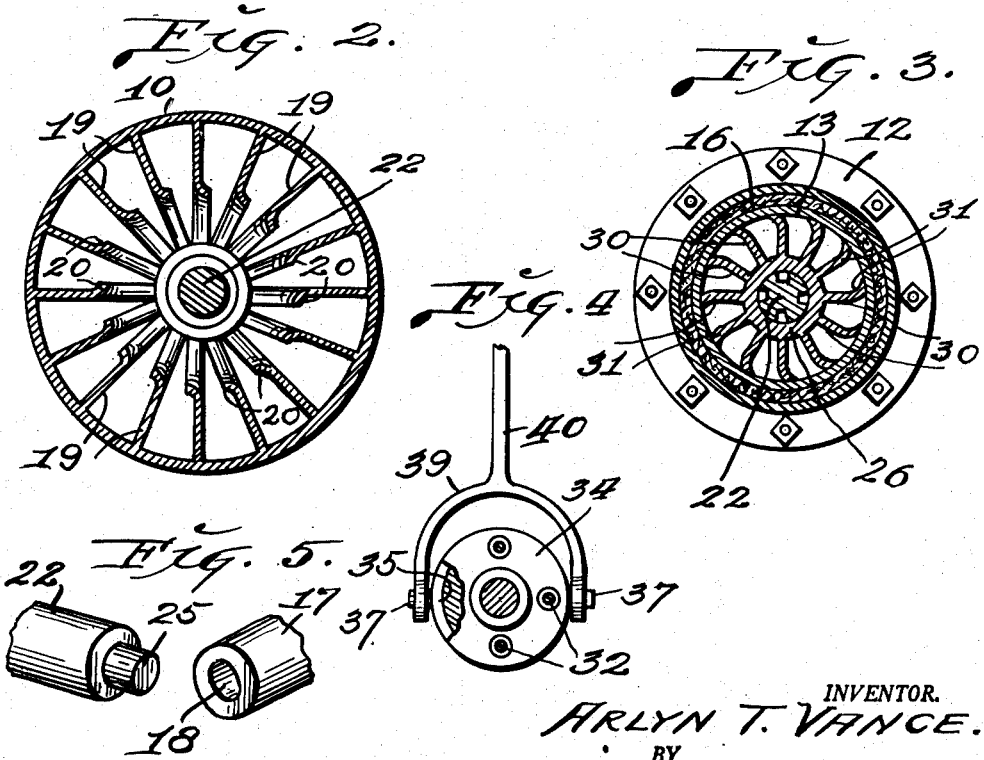
INVENTOR.
ARLYN T. VANCE.

Patented Feb. 3, 1953

2,627,331

UNITED STATES PATENT OFFICE 2,627,331

VANE TYPE FLUID CLUTCH

Arlyn T. Vance, Sherman Oaks, Calif.

Application May 6, 1947, Serial No. 746,356

1 Claim. (Cl. 192—53)

My invention relates to a clutch or coupling utilizing liquid for transmitting the motion and power of a driving shaft or member, to a driven member, and the principal objects of my invention are, to provide simple and efficient means for accurately regulating the degree of speed of the transmitted rotative motion, further to provide a compact, fluid power transmitter which may be advantageously used in automobiles and other power driven vehicles and machines, and further, to generally improve upon and simplify the construction of the existing forms of fluid clutches and couplings.

With the foregoing and other objects in view, my invention consists in certain novel features of construction and arrangement of parts which will be hereinafter more fully described and claimed and illustrated in the accompanying drawings, in which:

Fig. 1 is a vertical longitudinal section taken through the center of my improved fluid clutch.

Fig. 2 is an enlarged cross section taken on line 2—2 of Fig. 1.

Fig. 3 is an enlarged cross section taken on the line 3—3 of Fig. 1.

Fig. 4 is a cross section taken on the line 4—4 of Fig. 1.

Fig. 5 is a perspective view of the ends of the driving and driven shafts.

Referring by numerals to the accompanying drawing which illustrates a preferred embodiment of my invention, 10 designates a short cylindrical housing having one end closed by a plate 11, and the other end being closed by a removable plate 12, carrying a smaller drum or housing 13, and the other end of the latter being closed by a removable plate 14. End wall 11 is provided with an anti-friction bearing 15 and a stuffing box 16 for the driven shaft 22 and the end of a driving shaft 17 is fixed to end wall 11 of drum 10, and formed in said end is an axial aperture 18. The stuffing box 16 is for the purpose of preventing oil leakage between the bearing 15 and the wall of housing 10.

Arranged between plate 12 and the wall of drum 13 is an anti-friction bearing 15' and a stuffing box 16' the latter, for maintaining a liquid tight joint between said wall 12 and the end of drum 13.

Formed integral with the wall of drum 10 are internally arranged longitudinal vanes or flanges 19, the free edges of which are all curved slightly in the same direction, as designated by 20.

The driven shaft 22 passes through a stuffing box 23 on plate 14, axially through drums 13 and 10, with the end of said shaft provided with an axial pin 25, which occupies aperture 18 in the driving shaft 17 (see Fig. 5).

Mounted to slide on driven shaft 22 within drums 13 and 10 is a sleeve 26, having internal lugs 27 which traverse longitudinal grooves 28 in shaft 22, thus enabling said sleeve to slide upon and rotate with said driven shaft.

Integral with the end of sleeve 26 adjacent end plate 14 of drum 13 is a disc 29, and formed integral therewith and with sleeve 26 are longitudinally disposed blades or vanes 30, the edges thereof, being all curved in the same direction as designated by 31, with such curvature opposing the curvature of the edges 20 of vanes 19.

The ends of the vanes 30 projecting from drum 13 are curved as designated by 30a and the ends of the vanes 19 adjacent plate 14 are oppositely curved as designated by 19a.

Secured to disc 29 are the inner ends of rods 32, which pass through stuffing boxes 32 on end plate 14, and the outer ends of said rods are secured by a disc 34 mounted to slide on driven shaft 22.

Formed on the periphery of disc 34 is a groove 35 in which is loosely seated, a ring 36 having diametrically disposed pins 37, that pass through short slots 38 in the arms of a yoke 39. This yoke is carried by a lever 40 fulcrumed at 41 to a fixed member 42.

The chambers within drums 10 and 13 are filled or practically filled with a heavy liquid such as oil or glycerine.

With sleeve 26 and its vanes positioned in drum 13, as seen in Fig. 1, drum 10 will be rotated with shaft 17, without transmitting rotary motion to drum 13 and vanes 30.

To cause rotary motion to be imparted to shaft 22, lever 40 is actuated to move disc 34 and ring 36 toward drum 13, and as the ends of vanes 30 enter the chamber within said drum 10 and its vanes, the pressure of the fluid actuated by vanes 19 will be impressed against said vanes 30, thereby imparting rotary motion to said vanes, the sleeve 26, shaft 22 and drum 13. Obviously drum 13 must be mounted so as to rotate in the end wall 12 of drum 10, so that hand lever 40 may be actuated to move sleeve 26 and the vanes 30 thereon, into the space between vanes 19 in drum 10. For this reason, it is essential that a stuffing box such as 16' be provided on the end wall 12 of drum 10. This "in line" arrangement of the drums 10 and 13 with the actuating means 40, 36 and 32, together with the aligned shafts 22 and 17 and the stuffing boxes for said shaft and the smaller drum, provide a simple, practical arrangement easily assembled or taken apart and with all parts readily accessible in the event of adjustment and repairs.

The speed of rotary motion thus delivered to shaft 22, may be accurately controlled by regulating the distance that vanes 30 are moved into the space between vanes 19 or drum 10, or into that portion of the liquid directly acted upon by said vanes 19.

Thus it will be seen that I have provided a variable speed and power transmitting apparatus that is simple in structure, devoid of all gears, capable of being actuated so as to accurately regulate the speed of the transmitted motion and power and which apparatus is highly effective in performing the functions for which it is intended.

Minor changes in the size, form and construction of the various parts of my improved fluid clutch or power transmission may be made and substituted for those herein shown and described, without departing from the spirit of my invention, the scope of which is set forth in the appended claim.

I claim as my invention:

In a fluid power transmission device, a housing, a series of vanes within said housing, the longitudinal edges of said vanes all being curved in the same direction, an axially disposed shaft journalled in said housing, a removable wall closing one end of said housing, a second housing co-axial with said first mentioned housing journalled in and extending outwardly from said end wall, an anti-friction bearing and a stuffing box between the end wall of the first mentioned housing and said second mentioned housing, a member arranged to slide upon and rotate with said shaft within said second mentioned housing, vanes upon said last mentioned member, the outer edges of all of said last mentioned vanes being curved in a direction opposite the curvature of the blades on the edges of said first mentioned blades, a closure for the outer end of said second mentioned housing and means mounted on said shaft external of said second mentioned housing and passing through said closure for moving the sliding member bodily into and from the space within the curved vanes in the first mentioned housing.

ARLYN T. VANCE.

REFERENCES CITED

The following references are of record in the file of this patent:

UNITED STATES PATENTS

| Number | Name | Date |
|---|---|---|
| 1,428,586 | Garrison | Sept. 12, 1922 |
| 1,957,124 | Yahn | May 1, 1934 |
| 2,073,357 | Wemp | Mar. 9, 1937 |
| 2,078,597 | Beaumont | Apr. 27, 1937 |

FOREIGN PATENTS

| Number | Country | Date |
|---|---|---|
| 318,360 | Italy | June 11, 1934 |